United States Patent
Lindner et al.

(10) Patent No.: US 10,328,622 B2
(45) Date of Patent: Jun. 25, 2019

(54) INJECTION MOULD WITH TEMPERATURE-CONTROL SYSTEM

(71) Applicant: Gerresheimer Regensburg GmbH, Regensburg (DE)

(72) Inventors: Sandra Lindner, Pfreimd (DE); Rainer Lingl, Vohenstrauss (DE); Otto Bernklau, Schnaittenbach (DE); Holger Heining, Lappersdorf (DE)

(73) Assignee: Gerresheimer Regensburg GMBH, Regensburg (DE)

( * ) Notice: Subject to any disclaimer, the term of this patent is extended or adjusted under 35 U.S.C. 154(b) by 71 days.

(21) Appl. No.: 15/197,600

(22) Filed: Jun. 29, 2016

(65) Prior Publication Data

US 2017/0001355 A1    Jan. 5, 2017

(30) Foreign Application Priority Data

Jul. 2, 2015    (EP) .................................. 15175109

(51) Int. Cl.
*B29C 45/73* (2006.01)
*B29C 45/26* (2006.01)
*B29L 31/00* (2006.01)

(52) U.S. Cl.
CPC ........ *B29C 45/7312* (2013.01); *B29C 45/261* (2013.01); *B29C 45/2626* (2013.01); *B29L 2031/7544* (2013.01)

(58) Field of Classification Search
CPC ............ B29C 45/7312; B29C 45/2626; B29C 45/2642; B29C 45/2737; B29C 2033/042; B29L 2031/7544
See application file for complete search history.

(56) References Cited

U.S. PATENT DOCUMENTS

2012/0128812 A1*    5/2012    Fields ................... B29C 49/063
425/525

FOREIGN PATENT DOCUMENTS

| CN | 102548730 A | 7/2018 |
| JP | H08103930 | 4/1996 |

(Continued)

OTHER PUBLICATIONS

English translation of JPH08103930 (Year: 1996).*

(Continued)

*Primary Examiner* — Joseph S Del Sole
*Assistant Examiner* — Mohamed K Ahmed Ali
(74) *Attorney, Agent, or Firm* — Leydig, Voit & Mayer, Ltd.

(57) ABSTRACT

An injection mold having a cavity for receiving a plastics melt and having a temperature-control system. The cavity comprises a plate-shaped first part and a plurality of hollow cylindrical second parts arranged next to one another perpendicularly to the first part. The temperature-control system comprises temperature-control channels divided into channel portions for transporting a temperature-control medium and a first and a second temperature-control medium connection, with at least one first channel portion arranged in parallel with the first part. Second channel portions are connected by a first end to the first channel portion and by a second end to a first end of a third channel portion. Third channel portions are connected by a second end to a fourth channel portion. One of the second channel portions and the connected third channel portion are surrounded at least in part by one of the second parts of the cavity.

10 Claims, 6 Drawing Sheets

(56) References Cited

FOREIGN PATENT DOCUMENTS

| | | |
|---|---|---|
| JP | 2006007271 | 1/2006 |
| JP | 2007276224 | 10/2007 |
| WO | 2011/034281 | 3/2011 |

OTHER PUBLICATIONS

European Search Report, dated Sep. 24, 2015, corresponding to European Application No. 15175109.6 (filed Jul. 2, 2015), parent of the present application, 3 pp.

Chinese Office Action corresponding to Chinese Patent Application No. 201610489279.3, dated Feb. 9, 2018, 7 pgs.—Search Results on p. 6 only.

\* cited by examiner

INJECTION MOULD WITH TEMPERATURE-CONTROL SYSTEM

CROSS-REFERENCE TO RELATED APPLICATIONS

This patent application claims the benefit of priority from European application EP 15 175 109.6, filed on Jul. 2, 2015, the contents of which are incorporated herein by reference.

BACKGROUND OF THE INVENTION

The invention relates to an injection mould having a cavity for receiving a plastics melt, the cavity comprising a plate-shaped first part and a plurality of hollow cylindrical second parts which are arranged next to one another perpendicularly to the first part, and having a temperature-control system which comprises both temperature-control channels divided into channel portions for transporting a temperature-control medium and a first and a second temperature-control medium connection.

Medical containers, in particular packaging for medical substances, are usually produced, packed and sterilised by primary packaging manufacturers under clean room conditions. Medical containers of this type can include syringe bodies, ampoules, pre-fillable syringes, cartridges, vials, bottles, cartridge needle units and glass cylinders. The medical containers can be produced from glass or plastics material. Typically however, the medical containers are not processed individually but are delivered in holding devices to the next production step, for example sterilisation or also siliconisation. The medical containers to be transported usually comprise a holding means, for example a flange which engages in the holding device so that the containers are held in a suspended manner. Holding devices of this type are also known as a "syringe nest". Such holding devices are also used for further transportation to a bottler, for example. For this purpose, the holding device is introduced into a tank which is sealed with a membrane, thereby maintaining the sterility of the medical containers.

For example, a holding device of this type contains 100 or 160 receiving devices for a respective syringe, the diameter of a receiving device (also called a cylinder due to its shape) being for example 12.2 mm or 9.4 mm. The article to be produced "100 Nest Ø12.2 for RTF syringes" is accordingly characterised for example by a cylinder die or dome die respectively having a total of 100 cylinders (domes). These cylinders are joined together by connecting webs. The injection mould for producing a syringe nest of this type must accordingly have just as many cores to internally delimit the hollow cylindrical parts and a die to delimit the cavity.

According to a first instance, it would be conceivable that, during the production of a workpiece produced from a plastics material (for example from a thermoplastic), to solidify the melt, the amount of heat which is produced must be removed as efficiently as possible and thus it is necessary to use a temperature-control medium for cooling which has the lowest possible temperature, bearing in mind the required viscosity. According to a second instance, there are examples of plastics materials (for example thermosetting plastics and elastomers) which are still crosslinking in the mould and, for this they need to be heated, whereby the temperature-control medium should have a higher temperature for heating. The principles of the present invention would also operate for a heating procedure as the second instance analogously to the cooling procedure as the first instance; however, for the sake of simplicity, the present invention is only described for the first instance, i.e. for a cooling procedure.

Due to the relatively large component dimensions and to the described geometric conditions, during production by injection moulding, the described syringe nest exhibits a strongly pronounced distortion behaviour, which also leads to bending of the resulting moulding. Furthermore, due to the high volume of the moulding, the evolution of a relatively great amount of heat is to be expected during production which must be removed as efficiently as possible in view of the cooling time and thus also of the total cycle time.

In view of the shape of a workpiece to be produced, in this respect, a conformal cooling must be realised. Since the larger the available surface, the greater the transferable amount of heat, the amount of heat must be effectively removed particularly in the areas which are characterised by a low ratio of workpiece surface to workpiece volume. In the case of the syringe nest, these are in particular the areas in which the hollow cylindrical second parts come together and/or where they meet the first plate-shaped part.

To remove this quantity of heat, the moulds which are currently used are temperature-controlled by a serial cooling concept. This means that starting from a temperature-control medium connection, the temperature-control medium (usually water or oil) is transported successively through the cooling channel portions and thereby successively through the individual cores.

However, this cooling concept entails a very high loss of pressure in the cooling system, because all the individual pressure losses are added together. Due to this fact, the volume flow is throttled and the heat dissipation is greatly minimised. This adversely affects the cooling time and thereby adversely affects the total cycle time. This cooling concept cannot effectively counteract the strong distortion tendency of the article.

Furthermore, the only small volume flow can cause blockages in the cooling system because particles of dirt can be deposited relatively easily. This problem is known in practice and requires a great amount of maintenance.

In addition, this cooling concept suffers from the disadvantage of an irregular removal of heat at the article. The reason for this is that the cooling medium heats up between the coolant feed and coolant discharge. In the serial cooling concept, the temperature-control medium has a much lower temperature when it is transported through the first core compared to when it is transported through the last core. Consequently, the quantities of heat which are produced per core cannot be removed uniformly.

Furthermore, the high loss of pressure in the currently used serial cooling means that the pumping capacity of the temperature-control devices is not used efficiently. In this respect, the efficiency of the temperature-control device is reduced, which reduces the economic feasibility.

Thus, it is the object of the present invention to develop an injection mould having a cooling and temperature-control system or a temperature-control system respectively which is as simple and as efficient as possible and which provides a simple and clearly arranged cooling tubing and effectively uses the available cooling power of the temperature-control devices.

SUMMARY OF THE INVENTION

The object is achieved by an injection mould having a cavity for receiving a plastics melt, the cavity comprising a plate-shaped first part and a plurality of hollow cylindrical second parts which are arranged next to one another perpendicularly to the first part, and having a temperature-control system which comprises both temperature-control channels divided into channel portions for transporting a temperature-control medium and a first and a second temperature-control medium connection, characterised by at least one first channel portion arranged in parallel with the first part, several second channel portions which are connected by a first end to the first channel portion and are connected by a second end in each case to a first end of a third channel portion, the third channel portions being arranged such that they are connected by a second end to a fourth channel portion, arranged in parallel with the first part, in each case one of the second channel portions and the third channel portion connected thereto being arranged such that they are surrounded at least in part by one of the second parts of the cavity.

Thus, in other words, a parallel cooling concept is realised in order to meet as far as possible all the requirements imposed on the cooling system for this production mould. This cooling concept makes it possible to control the temperature of each core conformally and, in so doing, to reduce pressure losses in the cooling circuit to a minimum. Due to this fact, it is possible to remove the maximum amount of heat using a relatively low pumping capacity of the temperature-control devices, since due to the low pressure loss, a high volume flow can be throughput in the cooling holes or in the channel portions of the temperature-control channels respectively. The increased throughput or volume flow respectively in the present cooling concept also has the positive effect that particles of dirt cannot be deposited so easily in the cooling circuit and thus the general maintenance costs of the mould are reduced.

In turn, this leads to savings in respect of purchasing and with regard to the energy consumption of the temperature-control devices, which increases efficiency. At the same time, the total cycle time is shortened, which can increase the economy and profitability of the process enormously. Furthermore, the bending of the moulding can be reduced and thus the quality thereof can be improved, because due to the uniform removal of heat which is achieved through the use of the parallel cooling, the shrinkage behaviour is influenced in a positive manner.

In view of the fact that the parallel connected cooling circuits can be again connected in parallel, for example by means of a distributor plate in view of the supply of temperature-control medium, the tubing expense can be reduced by approximately 80%. Consequently, the costs for the cooling tubing can be greatly reduced. Due to the reduction of tubes for the temperature control of the mould, the workplace ergonomics also rises, and the danger of cooling tubes being wrongly connected is reduced to a minimum. The mass which is moved during the injection moulding process is also reduced, which in turn leads to energy savings.

It generally applies that the temperature-control medium can be transported from the first temperature-control medium connection to the second temperature-control medium connection (instance 1) or vice versa (instance 2). All descriptions for instance 1 thus apply analogously to instance 2.

According to a preferred embodiment of the injection mould, one of the second channel portions is respectively arranged to run at least in part in an interior of the third channel portion connected thereto. Preferably, at least the second end of the second channel portion is arranged such that it is surrounded by the third channel portion. More preferably, the respective second channel portion is arranged to run in a proportion of 10% to 90%, more preferably 30% to 70%, and most preferably in a proportion of 50% of its length in the interior of the third channel portion connected thereto. This facilitates the assembly of the cooling system, since a shorter length of cooling holes has to be provided in the material of the actual mould half.

Alternatively, it would also be conceivable for the second channel portion to be arranged at a distance from the third channel portion and/or to be arranged substantially parallel or with the formation of an angle thereto in the interior of a second portion.

According to a further preferred embodiment, it is advantageous if a transportation direction of the temperature-control medium from the first end of the second channel portions to the second end of the second channel portions is opposite to the transportation direction of the temperature-control medium from the first end of the third channel portions to the second end of the third channel portions. In other words, the arrangement of the third channel portions relative to the second channel portions requires a reversal of the transportation direction of the temperature-control medium at the outlet from the second channel portion, i.e. at the second end of the second channel portion. This is the case when, for example, the first and the fourth channel portion, into which the second and third channel portions respectively run, are arranged on the same side of the cavity, and thereby for example in the same mould half of the injection mould.

It is also conceivable for the first and the fourth channel portions to be arranged on different sides of the cavity, and thereby for example in different halves of the injection mould and/or to be able to be connected for example by rapid action couplings. In this case, the transportation direction of the temperature-control medium from the first end of the second channel portions to the second end of the second channel portions is the same as the transportation direction of the temperature-control medium from the first end of the third channel portions to the second end of the third channel portions.

Preferably, one of the second channel portions and the third channel portion connected thereto are arranged rotationally symmetrically around a centre axis of one of the second parts and/or the second channel portions are configured cylindrically and the third channel portions are configured to be hollow cylindrical.

Subject to the form of the mould, it is conceivable for at least one fifth channel portion to be arranged which is connected to the first temperature-control medium connection by a seventh channel portion, the first channel portion extending from the fifth channel portion. In this respect, the seventh channel portion is preferably directly connected to the first temperature-control medium connection.

It is also conceivable for at least one sixth channel portion to be arranged which is connected to the second temperature-control medium connection by an eighth channel portion, the fourth channel portion running into the sixth channel portion. In this respect, the eighth channel portion is preferably directly connected to the second temperature-control medium connection.

To produce the holes, which are to form the channel portions, as easily as possible and to achieve a cooling which is as uniform as possible, it is advantageous if the first, the fourth, the fifth, the sixth, the seventh and/or the eighth channel portions are substantially cylindrical.

Subject to the complexity of the workpiece, it may be advantageous for a plurality of described channel portions to be provided. Thus, a preferred embodiment of the invention provides that at least five, preferably ten or sixteen fifth channel portions are arranged and/or in each case at least five, preferably ten second channel portions are connected to at least one of the first channel portions. It is thereby possible to present a total of 100 and 160 respectively second and third cooling channel portions and thereby a preferred cooling system for the syringe nests mentioned at the outset.

This corresponds to an arrangement according to which at least five, preferably ten or sixteen sixth channel portions and/or in each case at least five, preferably ten third channel portions are arranged to run into at least one of the fourth channel portions.

It is thereby possible to present a total of 100 and 160 respectively second and third cooling channel portions and thereby a preferred cooling system for the syringe nests mentioned at the outset.

For a connection of the channel portions which is as simple as possible, without the threat of the first and fourth channel portions colliding, it is advantageous for the at least one first channel portion to be in each case at a further distance from the first part of the cavity than the at least one fourth channel portion. This particularly applies to the positioning of the first and fourth channel portions in the same half of the mould.

At the same time, it is advantageous that the centre axes of the cores, which are cooled by a single first channel portion or by the second and third channel portions connected to this single first channel portion respectively, advantageously all intersect the centre axis of this first channel portion. This ensures the shortest possible transportation path of the temperature-control medium. When the fourth channel portion is arranged in the same mould half as the first channel portion, the same arrangement cannot, however, be selected for said fourth channel portion, i.e. the centre axes of the corresponding cores preferably do not intersect the centre axis of the fourth channel portion. More preferably, the centre axes of the cores also do not intersect the entire fourth channel portion, so that the centre axis thereof is arranged for example perpendicularly to the centre axes of the cores and the centre axis thereof and the outer boundary thereof is at a distance from the centre axes of the cores, a distance between the centre axis of the cores and the centre axis of the fourth channel portion being greater than a radius of the fourth channel portion.

It is thus preferred for the at least one fourth channel portion to be arranged at a further distance from the centre axis of the second parts associated therewith than the at least one first channel portion.

Further advantages, objectives and characteristics of the present invention will be described using the following description of the accompanying drawings. Similar components can have the same reference signs in the different embodiments.

DETAILED DESCRIPTION OF THE INVENTION

Figure 1:
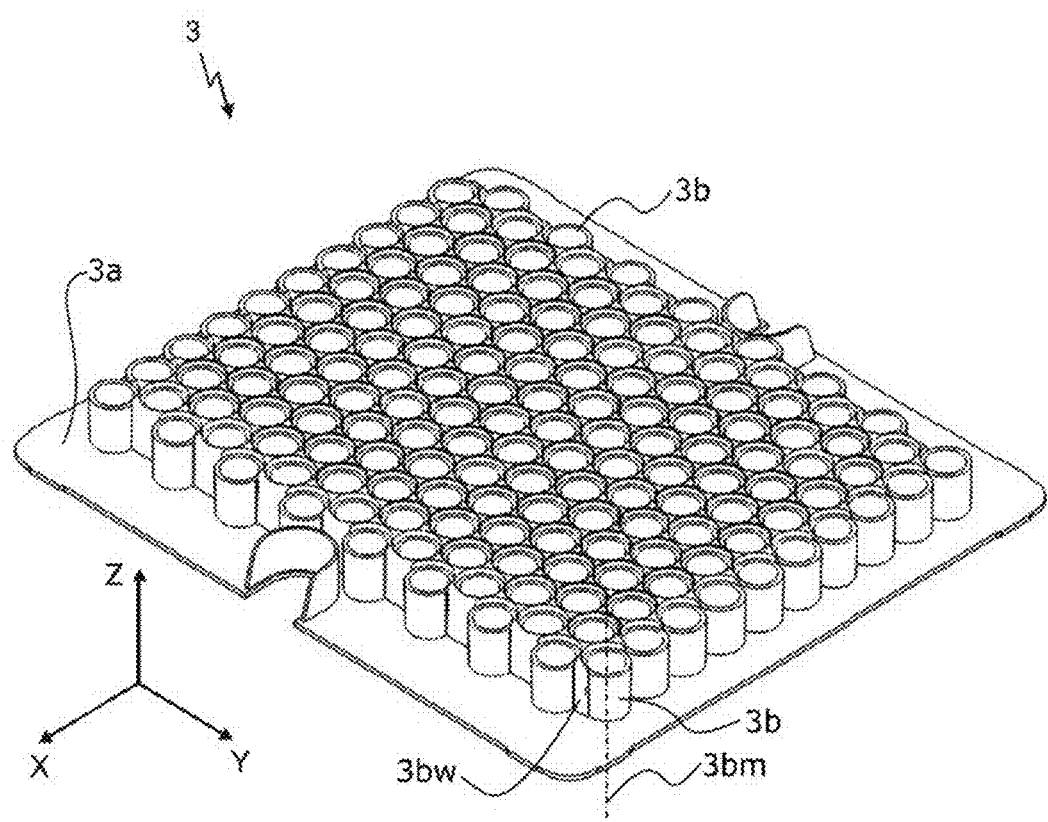
FIG. 1 is a perspective view of a syringe nest.

FIG. 1 is an isometric view of a holding device 3 for transporting medical containers 10 (see FIG. 2) which is also called a syringe nest 3 and has been produced for example from a thermoplastic by an injection moulding process. The holding device 3 has a vertical direction Z, a longitudinal direction X and a width direction Y. Here, the holding device is provided with a plate-shaped first part 3a and a plurality of hollow cylindrical second parts 3b and, in this example, ten second parts are respectively arranged in the longitudinal direction X and 16 second parts 3b are respectively arranged in the width direction Y, i.e. a total of 160 second parts 3b are arranged. It can be seen that the second parts 3b are arranged such that they adjoin one another as closely as possible to optimally utilise the available area. This results in the fact that local walls 3bw of a plurality of second parts 3b, for example three second parts meet one another and form in this position an area which is characterised by a low surface-volume ratio and thus by a relatively low removal of heat.

Figure 2:
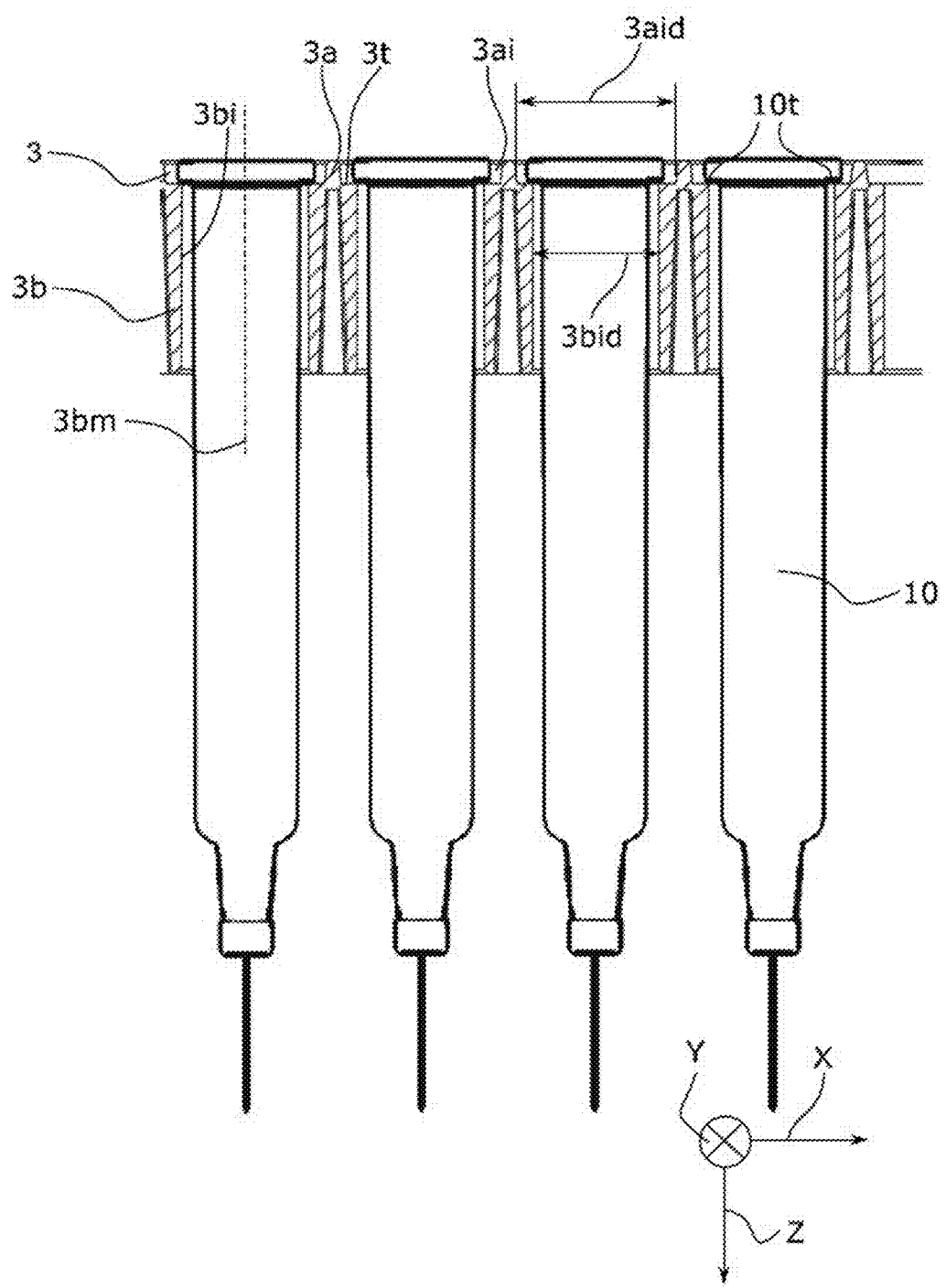
FIG. 2 is a sectional view of a syringe nest which has been filled.

FIG. 2 shows a detail of the syringe nest 3 from FIG. 1 in a filled condition, i.e. a medical container 10, in the present case an RTF (ready-to-fill) syringe, is arranged in each second part 3b. It can also be seen in this view that an inner bore 3bi of the hollow cylindrical second parts 3b extends as far as to the first plate-shaped part 3a and is supplemented inside the first parts 3a by a further bore 3ai, i.e. it directly adjoins thereto. The diameter 3aid of the further bore 3ai is greater than the diameter 3bid of the first bore 3bi, so that a shoulder 3t is arranged between the diameters 3aid and 3bid. A respective shoulder 10t of the syringes 10 rests on said shoulder and is thereby secured against sliding downwards in the vertical direction Z.

The syringe nest 3 equipped in this manner is then arranged in a tank (not shown here) and sterilised. The tank is then sealed with a membrane.

Figure 3A:
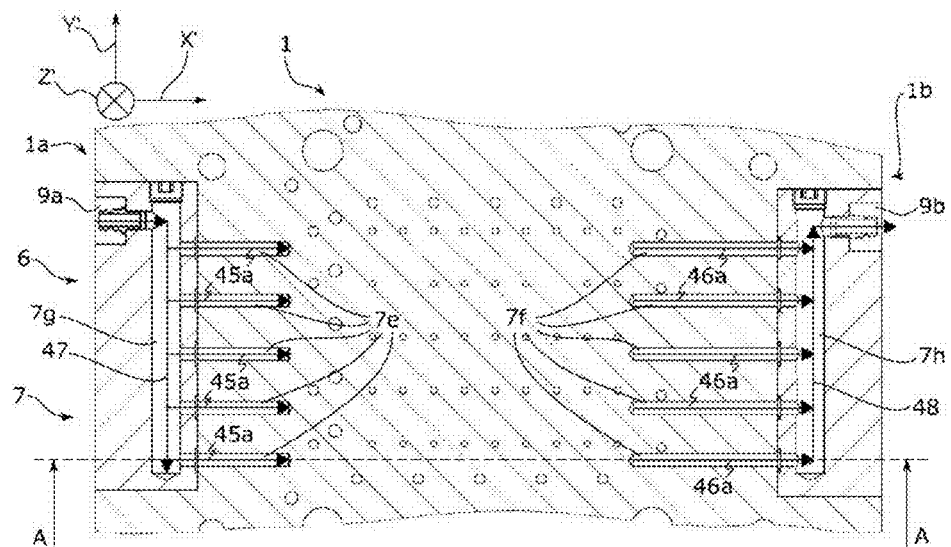
FIG. 3A is a plan view of a first embodiment of the injection mould according to the invention with cutaway details.

FIG. 3A shows a detail of a temperature-control system 6 of an injection mould 1 of the invention according to a first embodiment which is capable of producing a syringe nest for 100 syringes. The injection mould has a vertical direction Z', a longitudinal direction X' and a width direction Y'.

Visible on a first side 1a of the injection mould 1 is a first temperature-control medium connection 9a, to which a channel portion 7g is directly connected. Flowing in this seventh channel portion 7g is a temperature-control medium 8 in a transportation direction 47 which corresponds here to a width direction Y' of the injection mould 1. In the present case, five further fifth channel portions 7e are arranged at a right angle to the seventh channel portion 7g.

Arranged on a second side 1b of the injection mould 1 is a second temperature-control medium connection 9b which is connected in the present case to an eighth channel portion 7h. Here, five sixth channel portions 7f run into this eighth channel portion.

Figure 3B:
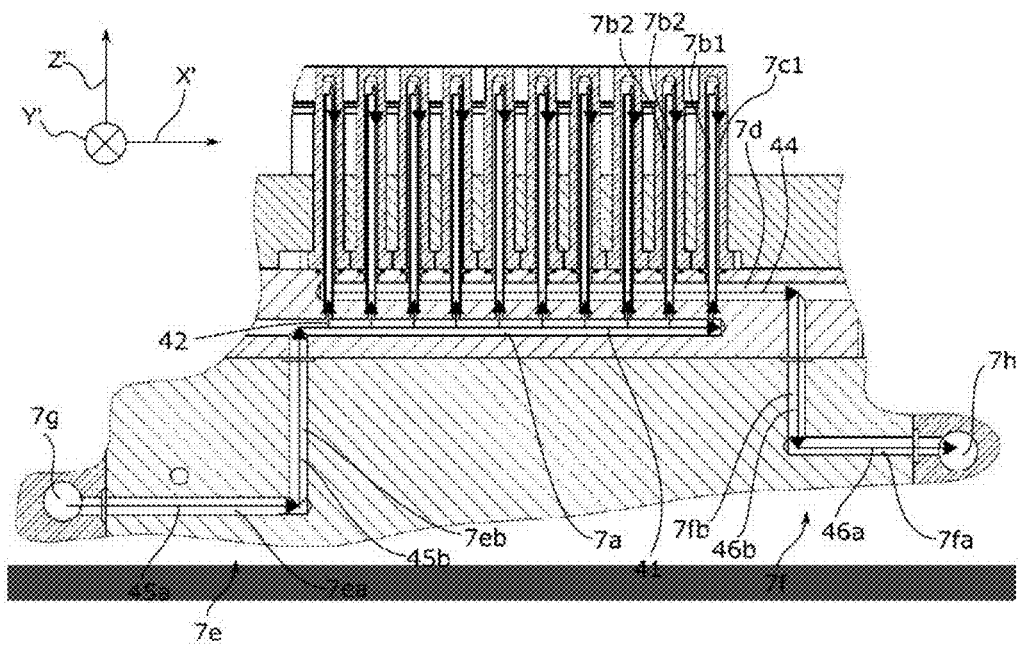
FIG. 3B is a sectional view of the first embodiment of the injection mould according to the invention.
Figure 5:
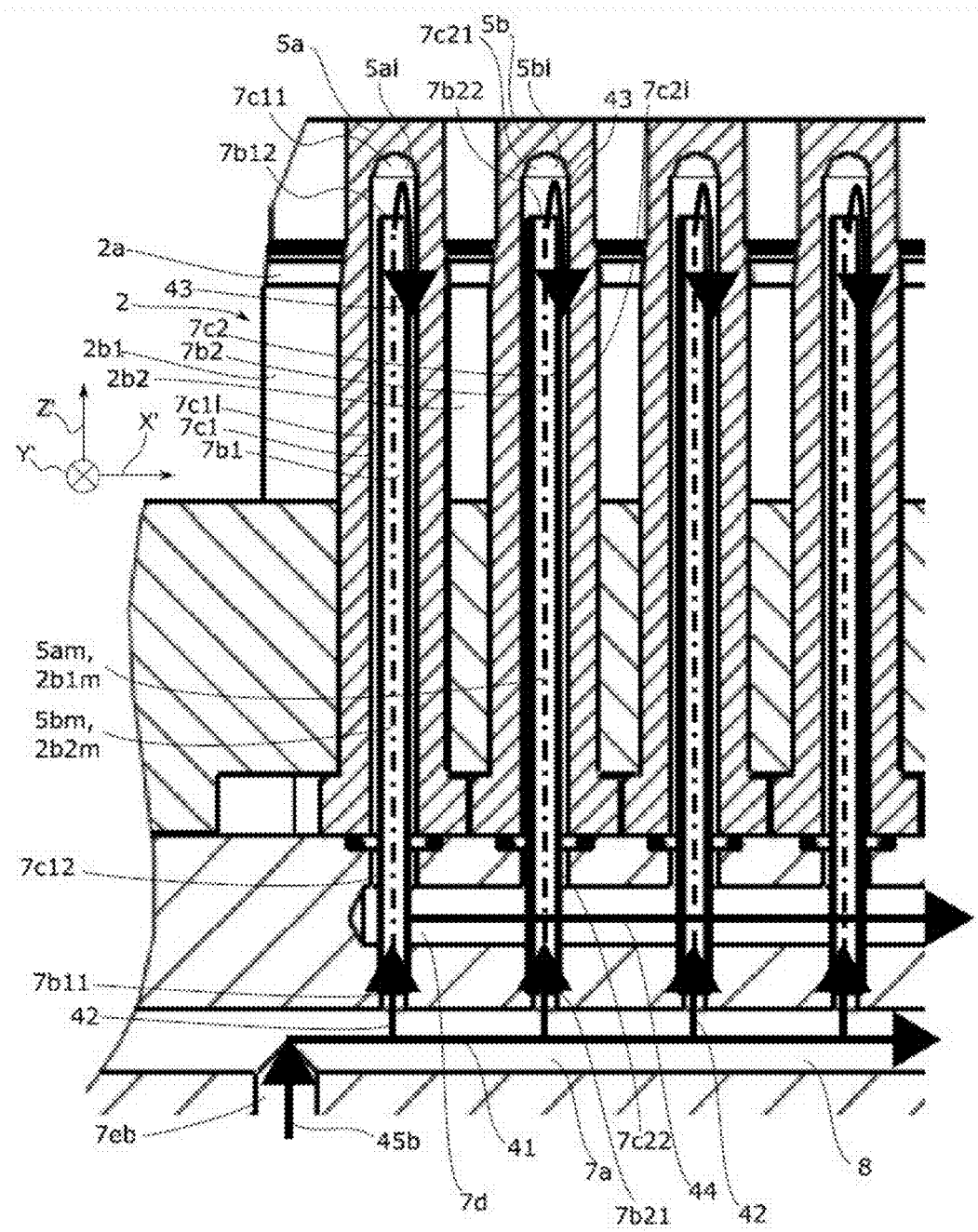
FIG. 5 is an enlarged view of a detail from FIG. 3B.

The parallel-connected cooling circuits which are shown in FIGS. 3B and 5 and consist of the channel portions 7a to 7d are thus again connected in parallel by the plurality of fifth channel portions 7e and sixth channel portions 7f in respect of the supply of temperature-control medium.

Here, the transportation direction of the temperature-control medium 8 runs from the first temperature-control medium connection 9a to the second temperature-control medium connection 9b (instance 1).

FIG. 3B is a view of the injection mould from FIG. 3A along a cross sectional line A-A, only one of the fifth channel portions 7e being visible. Said channel portion can be divided into a first part 7ea and a further part 7eb, the parts 7ea and 7eb being arranged at a right angle to one another here. The same applies analogously to the sixth channel portion 7f with a first part 7fa and a second part 7fb.

FIG. 5 is an enlarged view of a detail from FIG. 3B. This view shows a detail of the cavity 2, not filled here, with some of the plate-shaped first part 2a and a plurality of hollow cylindrical second parts 2b1, 2b2. In the following, only selected second parts 2b1, 2b2 and selected cores 5a, 5b respectively will be described, although the description also applies to the rest of the second parts and to the rest of the cores.

These parts 2a, 2b1, 2b2 form the negative mould for the parts 3a, 3b of the syringe nest 3 and, during the course of the production process, are filled with plastics melt. Associated with each second part 2b1, 2b2 is a core 5a, 5b (illustrated here by way of example with two cores) which, as an inner boundary, allows the formation of the desired hollow cylindrical shape of the second parts 2b1, 2b2. The cores 5a, 5b themselves are also substantially hollow cylindrical, part of the temperature-control system 6 in the form of a respective second channel portion 7b1, 7b2 and a third channel portion 7c1, 7c2 connected thereto being arranged in an interior 5ai, 5bi of the cores 5a, 5b for conformal cooling.

From the fifth channel 7e, arranged at a right angle is a first channel portion 7a which is arranged in parallel with the first part 2a of the cavity 2. In turn, branching off at a right angle from the first channel portion are ten second channel portions 7b1, 7b2 which are connected by a first end 7b11, 7b21 to the first channel portion 7a and by a second end 7b12, 7b22 in each case to a first end 7c11, 7c21 of a third channel portion 7c1, 7c2, the third channel portions 7c1, 7c2 being connected by a second end 7c12, 7c22 to a fourth channel portion 7d arranged in parallel with the first part 2a.

At the same time, in the present case, respectively one of the second channel portions 7b1, 7b2 and the third channel portion 7c1, 7c2 connected thereto are surrounded at least in part by one of the second parts 2b of the cavity 2, in respectively one of the second channel portions 7b1, 7b2 running at least in part or in portions respectively in an interior 7c1i, 7c2i of the third channel portion 7c1, 7c2 connected thereto.

The temperature-control medium 8 thus flows at the second end 7b12, 7b22 out of the second channel portions 7b1, 7b2 and via the first end 7c11, 7c21 of the third channel portions 7c1, 7c2 into said third channel portions, the transportation direction thereof being reversed.

Here, a transportation direction 42 of the temperature-control medium 8 from the first end 7b11, 7b21 of the second channel portions 7b1, 7b2 to the second end 7b12, 7b22 of the second channel portions 7b1, 7b2 is opposite to a transportation direction 43 of the temperature-control medium 8 from the first end 7c11, 7c21 of the third channel portions 7c1, 7c2 to the second end 7c12, 7c22 of the third channel portions 7c1, 7c2.

Arranged rotationally symmetrically about an imaginary centre axis 2bm1, 2bm2 of one or more of the second parts 2b1, 2b2, which here also corresponds to the centre axis 5am, 5bm of the cores 5a, 5b associated with the respective second parts 2b1, 2b2, is one of the second channel portions 7b1, 7b2 and the third channel portion 7c1, 7c2 connected thereto.

At the same time, in the present case the second channel portions 7b1, 7b2 are configured cylindrically and the third channel portions 7c1, 7c2 are configured to be hollow cylindrical. Here, the first 7a, the fourth 7d, the fifth 7e, the sixth 7f, the seventh 7g and the eighth channel portion 7h are substantially cylindrical.

It can be seen that the at least one first channel portion 7a is respectively at a further distance from the first part 2a of the cavity 2, i.e. in the vertical direction Z' of the injection mould 1, than the at least one fourth channel portion 7d.

To allow the passage over between first channel portion 7a and second channel portions 7b1, 7b2 and also between third channel portions 7c1, 7c2 and fourth channel portion 7d without a collision in particular by first channel portion 7a and fourth channel portion 7d, the at least one fourth channel portion 7d is respectively at a further distance from the centre axis 2bm of the second parts 2b1, 2b2, associated therewith, than the at least one first channel portion 7a.

Thus here in each case the first 7a, the fourth 7d, the first part 7ea of the fifth 7e and also the first part 7fa of the sixth channel portion 7f run parallel to one another. Likewise, the second 7b1, 7b2, the third 7c1, 7c2, the second part 7eb of the fifth 7e and also the second part 7fb of the sixth channel portion 7f run parallel to one another. Furthermore, the seventh channel portion 7g and the eighth channel portion 7h run parallel to one another.

The flow direction 47 of the temperature-control medium 8 in the seventh channel 7g is opposite to the flow direction 48 in the eighth channel portion 7h. The same applies to the flow direction 45b in the second portion 7eb of the fifth channel portion 7e in relation to the flow direction 46b in the second portion 7fb of the sixth channel portion 7f. The flow direction 45a in the first portion 7ea of the fifth channel portion 7e, the flow direction 46a in the first channel portion 7fa of the sixth channel portion 7f, the flow direction 41 in the first channel portion 7a and the flow direction 44 in the fourth channel portion 7d are the same.

Figure 4A:
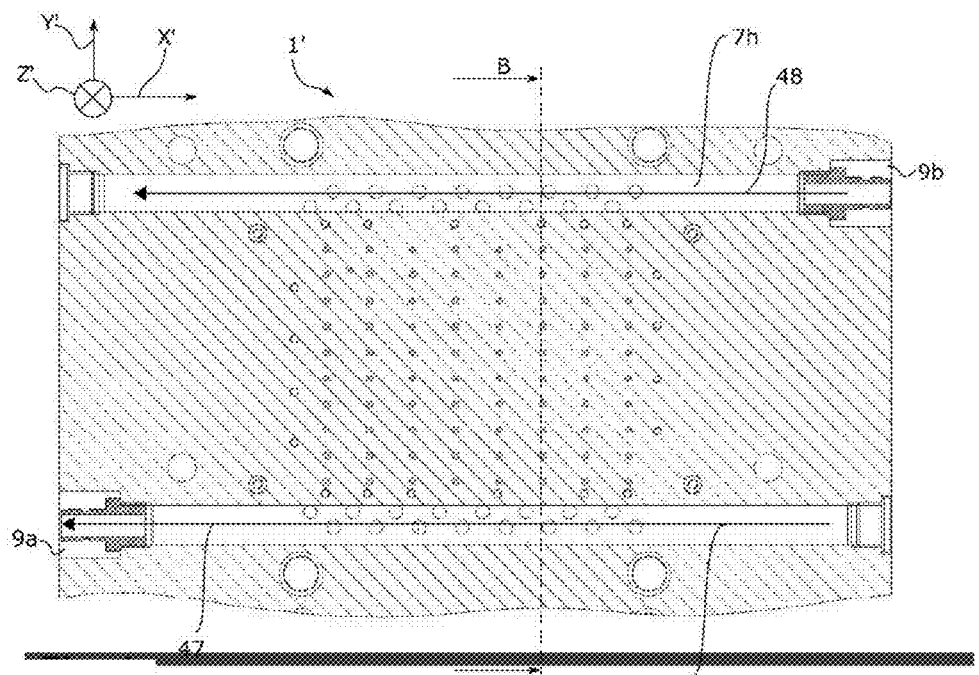
FIG. 4A is a plan view of a second embodiment of the injection mould according to the invention with cutaway details.

FIG. 4A is a plan view of a further embodiment of the injection mould 1' according to the invention which here is capable of producing a syringe nest 3 for the transportation of 160 syringes 10. Here, the transportation direction of the temperature-control medium 8 runs from the second temperature-control medium connection 9b to the first temperature-control medium connection 9a (instance 2). To avoid repeating descriptions of the rest of the structure and arrangement, reference is incidentally made to the description of FIGS. 3A, 3B and 5.

Figure 4B:
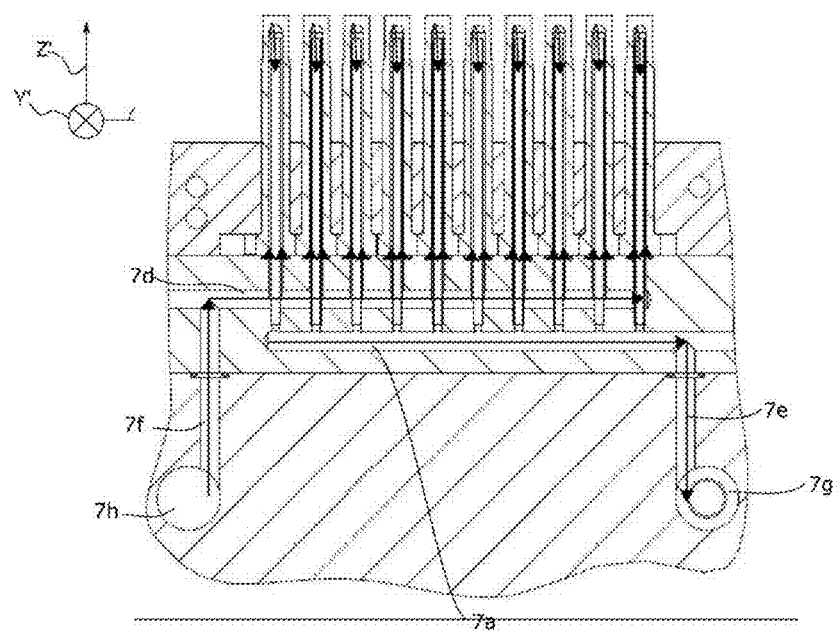
FIG. 4B is a sectional view of the second embodiment of the injection mould according to the invention.
Figure 6:
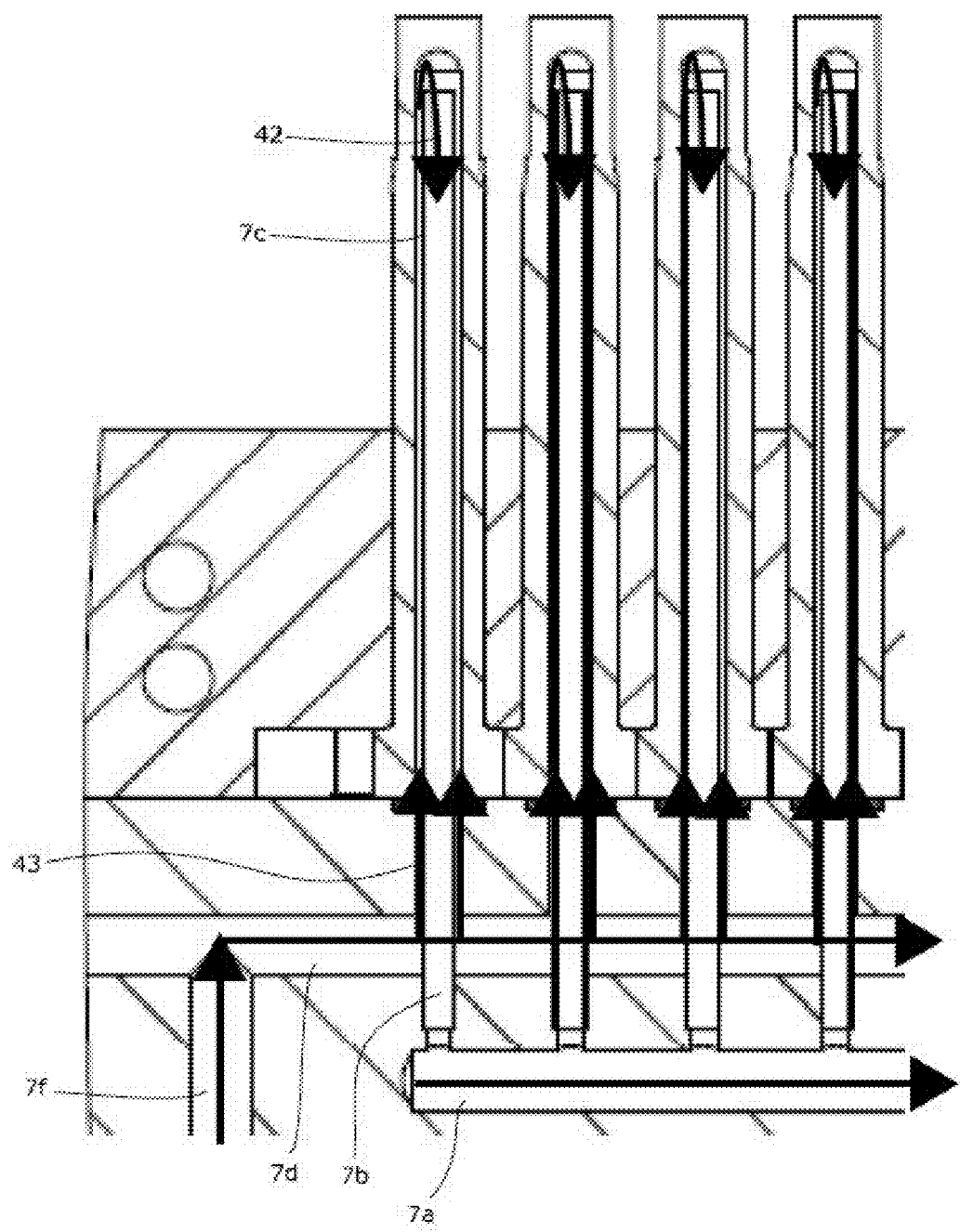
FIG. 6 is an enlarged view of a detail from FIG. 4B.

FIG. 4B shows a sectional view of the injection mould 1' according to FIG. 4A. The enlarged view according to FIG. 6 shows that, due to the reversed transportation direction of the temperature-control medium 8, compared to FIGS. 3A, 3B and 5, the temperature-control medium 8 flows out at the first end 7c11, 7c21 of the third channel portions 7c1, 7c2 and flows via the second end 7b12, 7b22 of the second channel portions 7b1, 7b2 into these second channel portions, the transportation direction thereof being reversed. In FIG. 6, only one core 5a and a second channel portion 7b and a third channel portion 7c are respectively identified. However, the same description applies to the other unidentified second and third channel portions.

The advantage of instance 1 over instance 2 is that less turbulence or a lower pressure loss respectively is to be expected as the temperature-control medium 8 passes from a cylindrical channel portion into a hollow cylindrical channel portion compared to the other way round. At the same time, instance 2 affords the advantage that the temperature-control medium 8 passes conformally through the third channel portion 7c1, 7c2, and it has an even lower temperature than in the second channel portions 7b1, 7b2.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Headings are used herein for convenience only.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. In the disclosure and the claims, "and/or" means additionally or alternatively. Moreover, any use of a term in the singular also encompasses plural forms.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

LIST OF REFERENCE SIGNS 1, 1' injection mould
1a, 1b sides
2 cavity
2a, 2b1, 2b2 parts
2b1m, 2b2m centre axis
3 holding device
3a, 3b parts
3ai, 3bi bore
3aid, 3bid diameter
3t, 10t shoulder
3bw wall
5a, 5b cores
5ai, 5bi interior of cores
5am, 5bm centre axis of cores
6 temperature-control system
7 temperature-control channel
7a-7f channel portions
7ea-7fb parts
7b11-7c22 ends of channel portions
7c1i-7c2i interior of channel portions
8 temperature-control medium
9a, 9b temperature-control medium connection
10 medical containers
41-48 transportation direction
X, X' longitudinal extension
Y, Y' width extension
Z, Z' vertical extension

The invention claimed is:

1. An injection mould comprising a cavity for receiving a plastics melt and comprising a temperature-control system,
   the cavity comprising a plate-shaped first part extending in a first and second direction and a plurality of hollow cylindrical second parts which are arranged next to one another perpendicularly to the first part,
   the temperature-control system comprises temperature-control channels divided into channel portions for transporting a temperature-control medium, and a first and a second temperature-control medium connection,
   wherein at least one first channel portion is arranged in parallel with the first part, several second channel portions are connected by a first end to the first channel portion and are connected by a second end in each case to a first end of a third channel portion,
   the third channel portions are connected by a second end to a fourth channel portion, arranged in parallel with the first part, in each case one of the second channel portions and the third channel portion connected thereto are surrounded at least in part by one of the second parts of the cavity, and in the direction of a longitudinal extension of the second channel portions,
   wherein the longitudinal extension of the second channel portions and a longitudinal extension of the third channel portions are both perpendicular to a longitudinal extension of the first channel portion and parallel to a third direction being perpendicular to the first and to the second direction, and
   the first end of the second channel portions being respectively arranged on a first side of the plate-shaped first part with respect to the third direction and the second end of the second channel portions being respectively arranged on a second side, opposite the first side, with respect to the third direction, of the plate-shaped first part,
   wherein a cooling circuit is established comprising the first channel portions, the second channel portions, the third channel portions and the fourth channel portions, wherein the injection mould comprises more than one of said cooling circuit, wherein the cooling circuit are connected in parallel towards each other in respect of the supply of temperature-control medium by means of a distributor plate,
   wherein the at least one fourth channel portion is respectively arranged at a further distance from the centre axis of the second parts associated therewith than the at least one first channel portion.

2. The injection mould of claim 1, wherein in each case one of the second channel portions is arranged to run at least in part in an interior of the third channel portion connected thereto.

3. The injection mould of claim 1, wherein a transportation direction of the temperature-control medium from the first end of the second channel portions to the second end of the second channel portions is opposite to a transportation direction of the temperature-control medium from the first end of the third channel portions to the second end of the third channel portions.

4. The injection mould of claim 1, wherein one of the second channel portions and the third channel portion connected thereto are arranged rotationally symmetrically around a centre axis of one of the second parts and/or the second channel portions are configured cylindrically and the third channel portions are configured to be hollow cylindrical.

5. The injection mould of claim 1, wherein at least one fifth channel portion is arranged which is connected to the first temperature-control medium connection by a seventh channel portion, the first channel portion extending from the fifth channel portion.

6. The injection mould of claim 1, wherein at least one sixth channel portion is arranged which is connected to the second temperature-control medium connection by an eighth channel portion, the fourth channel portion running into the sixth channel portion.

7. The injection mould of claim 6, wherein the first, the fourth, the fifth, the sixth, the seventh and/or the eighth channel portions are substantially cylindrical.

8. The injection mould of claim 5, wherein at least five fifth channel portions are arranged and/or in each case at least five, preferably in each case at least ten second channel portions are connected to at least one of the first channel portions.

9. The injection mould of claim 1, wherein the at least one first channel portion is respectively at a further distance from the first part of the cavity than the at least one fourth channel portion.

10. The injection mould of claim 2, wherein in each case one of the second channel portions is arranged to run in a proportion of 50% of its length in the interior of the third channel portion connected thereto.

* * * * *